United States Patent [19]

Falconer

[11] Patent Number: 4,681,139

[45] Date of Patent: Jul. 21, 1987

[54] ELASTOMER BALL CHECK VALVE

[75] Inventor: Ralph A. Falconer, Novato, Calif.

[73] Assignee: Jandy Industries, Novato, Calif.

[21] Appl. No.: 848,763

[22] Filed: Apr. 7, 1986

[51] Int. Cl.⁴ ............................................. F16K 15/04
[52] U.S. Cl. .................... 137/537; 137/539;
137/541; 137/903; 29/213 R
[58] Field of Search ............... 137/315, 535, 537, 539,
137/540, 541, 797, 903; 29/213 R

[56] References Cited

U.S. PATENT DOCUMENTS

| 755,370 | 3/1904 | Kessler | 137/537 X |
|---|---|---|---|
| 1,116,584 | 11/1914 | Gingrich | 137/315 X |
| 1,985,192 | 12/1934 | O'Marra | 137/537 X |
| 2,114,482 | 4/1938 | Vrtel | 137/539 X |
| 4,286,664 | 9/1981 | Bolding, Jr. | 137/537 X |
| 4,347,915 | 9/1982 | Cooper | 137/539 X |

FOREIGN PATENT DOCUMENTS

| 660909 | 7/1929 | France | 137/537 |
|---|---|---|---|
| 921787 | 5/1947 | France | 137/537 |
| 622502 | 5/1949 | United Kingdom | 137/537 |

*Primary Examiner*—Alan Cohan
*Assistant Examiner*—John A. Rivell
*Attorney, Agent, or Firm*—Melvin R. Stidham

[57] ABSTRACT

The disclosure is of a ball check valve comprising a valve body with a flow passageway completely through it. The flow passageway is counterbored at one end to form a conical seat and at the other end to form a radial shoulder. The valve member comprises an integral ball and stem of an elastomer. The stem is inserted through the valve passageway and stretched to function in the nature of a tension spring, with lateral extensions on the stem seated against the radial shoulder of the valve body.

7 Claims, 4 Drawing Figures

ELASTOMER BALL CHECK VALVE

BACKGROUND OF THE INVENTION

A ball check valve generally includes a highly finished metal ball that is biased against a conical seat by means of a compression spring. Pressure of fluid in the direction opposing the spring backs the ball away from the seat to enable flow through the valve, but pressure in the other direction supplements the spring force to bias the ball firmly against the seat and prevent flow.

Such ball check valves are widely used in grease fittings wherein grease is injected into a bearing, bushing or the like by means of a grease gun. There, the ball check functions to prevent outward flow of the grease. However, the cost of producing the highly finished metal ball check valves renders them rather expensive for use in many installations wherein cost is a significant factor.

OBJECTS OF THE INVENTION

It is an object of this invention to provide a ball check valve that is simple and inexpensive to manufacture, but reliable in operation.

It is a further object of this invention to provide a ball check valve that does not require highly finished metal surfaces.

Further objects and advantages of this invention will become apparent from the description to follow, particularly when read in conjunction with the accompanying drawing.

SUMMARY OF THE INVENTION

In carrying out this invention, there is provided a valve body having a flow passageway through it. The valve body is counterbored at one end to provide a conical seat around the flow and, at the other end, to provide a radial retaining shoulder. The valve member comprises an elastomer ball with an integral stem extending therefrom. The stem is inserted through the valve flow passageway and stretched until lateral extensions on the stem pass completely through. Then the stem is released to allow the lateral extensions to seat on the counterbored retaining shoulder. The lateral extensions do not block flow through the passageway. With the lateral extensions seated, the stem is under tension to pull the ball against its seat. Flow through the passageway along the stem engages behind the ball to stretch the stem and unseat the ball.

DESCRIPTION OF A PREFERRED EMBODIMENT

Figure 1:
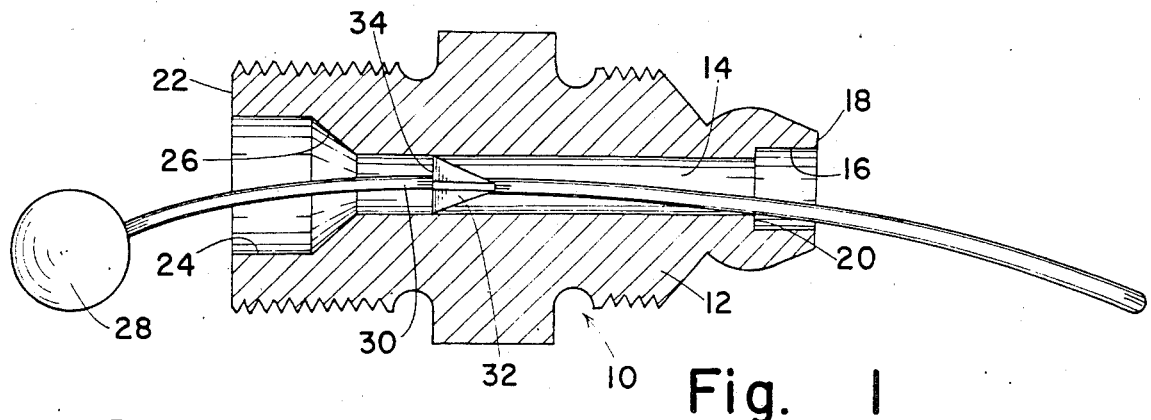
FIG. 1 is a section view of the ball check valve showing the valve and stem partially in place.
Figure 2:
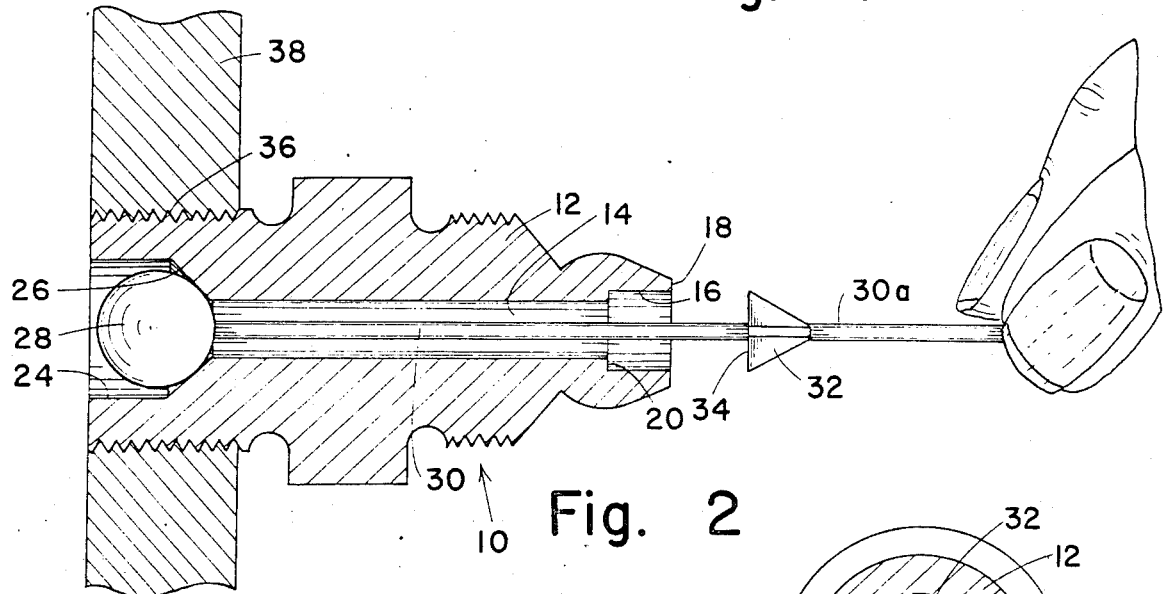
FIG. 2 is a section view of the valve with stem stretched for placement.
Figure 4:
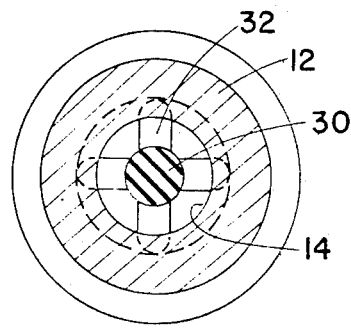
FIG. 4 is a section view taken along line 4—4 of FIG. 3.

Referring now to the drawing, the ball check valve 10 of this invention comprises a valve body 12 through which a longitudinal flow passageway 14 is bored or otherwise formed. A counterbore 16 at the inlet end 18 of the valve body forms a retaining shoulder 20 and, on the outlet side 22, a counterbore 24 forms a conical valve seat 26.

Figure 3:
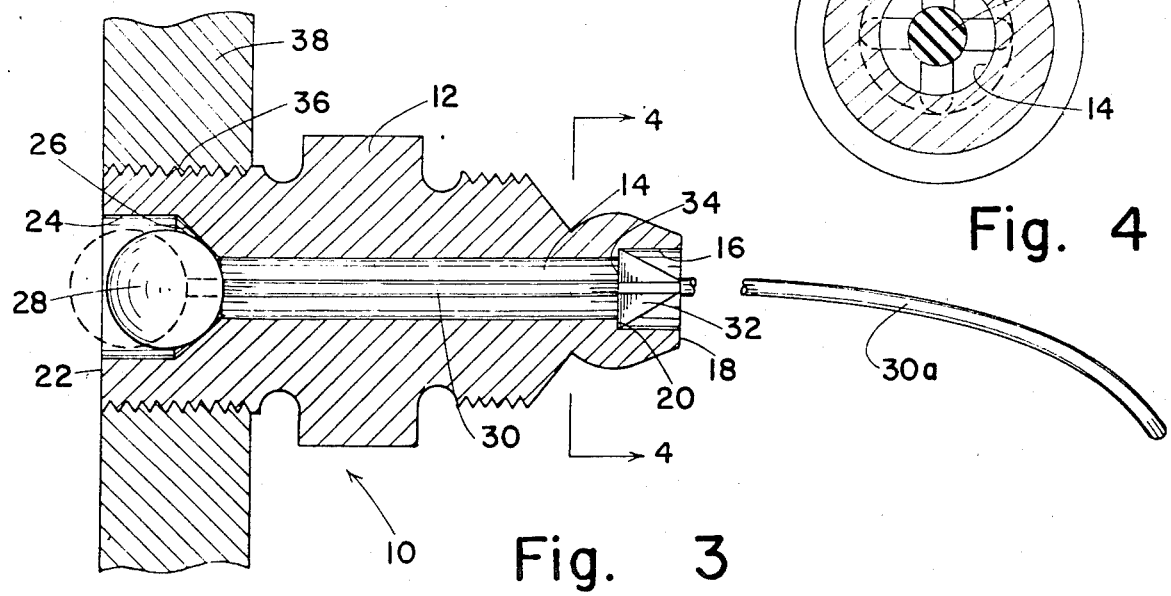
FIG. 3 is a section view of the valve in place with the end of the stem severed.

As shown in FIG. 3, an integral ball 28 and stem 30 of rubber or other elastomer is carried within the flow passageway 14, with the ball 28 sealing against the conical valve seating surface 26 and radial extensions 32 on the stem being seated against the retention shoulder 20. The radial extensions 32 are triangular in configuration to facilitate their insertion through the flow passageway 14, as shown in FIG. 1, and to enable flow of fluid between them when in normal, seating position, as shown in FIG. 3.

In placing the ball check 28 the stem is inserted through the flow passageway 14 as shown in FIG. 1 and stretched to carry the lateral extensions 32 beyond the upstream end 18 of the valve body 12. Then, the stem is relaxed to the position shown in FIG. 3 with the radial faces 34 of the triangular extensions 32 seated against the retaining shoulder 20 and the stem slightly stretched to pull the ball 28 against the seat. When the ball is so seated, the portion 30a of the stem beyond the lateral extensions 32 may be severed, as shown in FIG. 3. The resilience of the elastomer ball 28 enables it to provide a fluid-tight seal against the seat 26 without requiring the seat to be highly finished.

Threads 36 may be provided on the exterior of the body 12 to secure it in place in a wall 38 through which fluid is to be introduced. For example, the wall 38 may enclose a bushing or bearing to which a lubricant is to be introduced by application of a grease gun (not shown) to the upstream end 18 of the valve body. When the grease or other fluid is introduced under pressure, the ball 28 is urged away from its seat 26 by stretching the stem 30 to enable the grease to flow to the other side of the wall 38. Then, when pressure is released, the tension in the stem 30 pulls the ball back to the seating position shown in solid lines.

While this invention has been described in conjunction with a preferred embodiment thereof, it is obvious that modifications and changes thereto may be made by those skilled in the art to which it pertains without departing from the spirit and scope of this invention, as defined by the claims appended hereto.

What is claimed as invention is:

1. A check valve comprising:
    a valve body having a flow passageway therethrough;
    a valve seating surface on said body at and around one end of said flow passageway;
    a retaining surface on said body around the other end of said flow passageway;
    a valve stem of an elastomeric material;
    a valve plug fixed on one end of said stem engagable around said seating surface; and
    lateral extensions of said elastomeric material integral with said stem engagable with said retaining surface;
    said lateral extensions being in the general form of right triangles with inwardly tapering surfaces directed toward the other end of said stem to enable insertion of said other end and said lateral extensions into said flow passageway.
    the elastomeric material of said lateral extensions enabling distortion of said lateral extensions for passageway thereof through said passageway;
    said lateral extensions having radial surfaces seating against said retaining surface.

2. The check valve defined by claim 1 wherein:
said plug and stem are integral.

3. The check valve defined by claim 2 wherein:
said plug is a ball.

4. The check valve defined by claim 2 wherein:
said seating surface is conical.

5. The method of making a check valve comprising the steps of:
   forming a valve body with a flow passageway therethrough and having a seating surface at one end of said passageway and a retaining surface at the other end thereof;
   forming a valve closure member of elastic material, said closure member comprising a stem of an elastomeric material with a ball at one end thereof and integral lateral extensions near the other end thereof;
   inserting said stem through said passageway at said one end thereof;
   pulling said other end of the stem until the said lateral extensions thereon pass said retaining surface; and
   reducing tension on said stem until said lateral extensions seat on said retaining surface.

6. The method of making a check valve as defined by claim 5 wherein:
said ball is formed integral with said stem.

7. The method of making a check valve as defined by claim 5 including the further step of:
severing said other end of the stem outward of said lateral extensions.

* * * * *